UNITED STATES PATENT OFFICE.

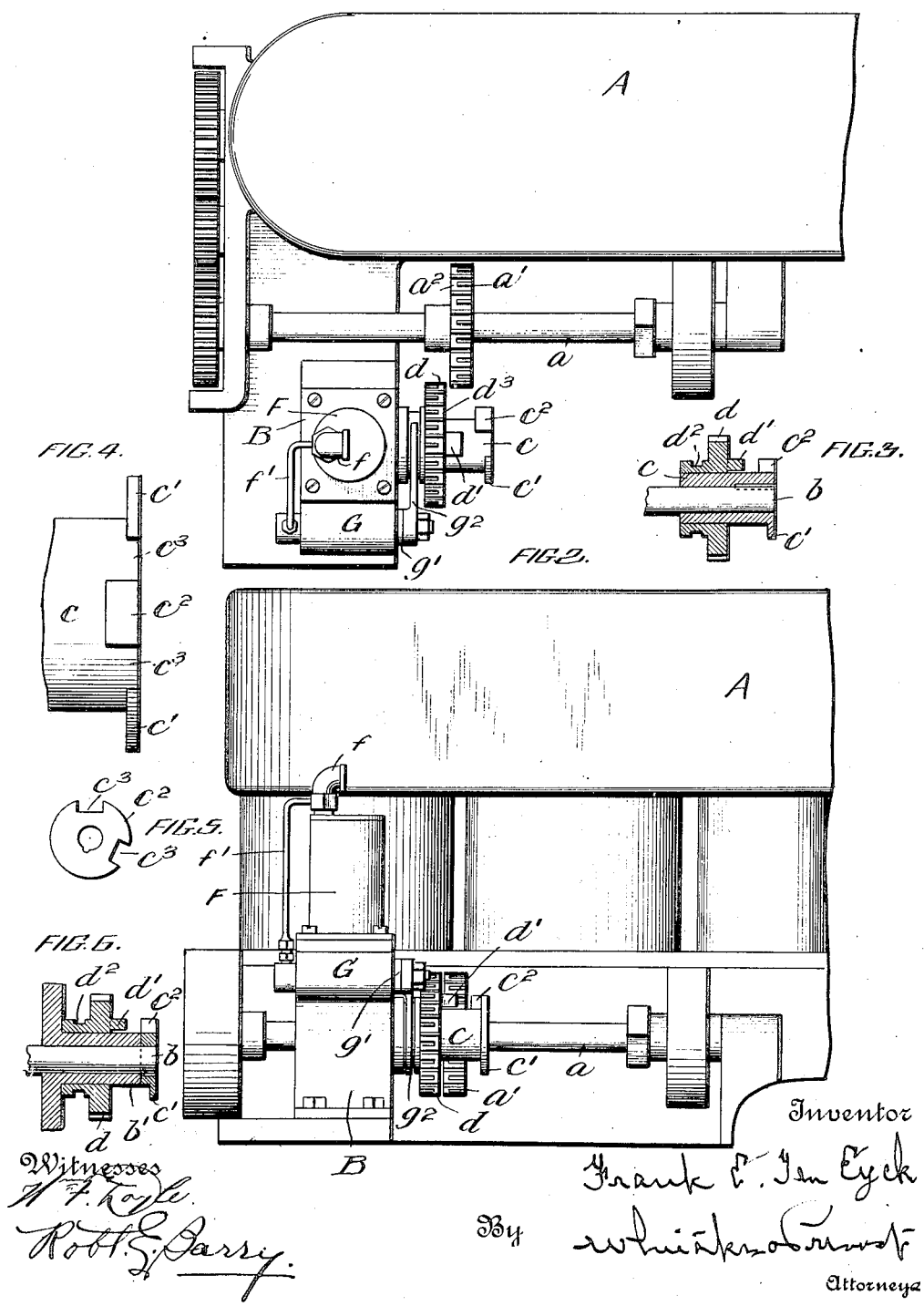

FRANK E. TEN EYCK, OF BOSTON, MASSACHUSETTS, ASSIGNOR TO AUTO AIR-ROTAR COMPANY, A CORPORATION OF MAINE.

GEARING.

1,134,358.  Specification of Letters Patent.   Patented Apr. 6, 1915.

Application filed July 30, 1912. Serial No. 712,335.

*To all whom it may concern:*

Be it known that I, FRANK E. TEN EYCK, a citizen of the United States, residing at Boston, in the county of Suffolk and State of Massachusetts, have invented certain new and useful Improvements in Gearing; and I do hereby declare the following to be a full, clear, and exact description of the invention, such as will enable others skilled in the art to which it appertains to make and use the same.

My present invention relates to air pumps for use in connection with automobiles and consists in a pump of this character adapted to be connected with the frame of the motor or other parts of the automobile and to be actuated when desired by said motor.

In the accompanying drawings, I have shown the best form in which I have contemplated embodying my said invention and the same is disclosed in the following description and claims.

In the drawings, Figure 1 is a plan or top view of an automobile motor provided with my improved pump. Fig. 2 is a side elevation of the same. Fig. 3 is a section of one form of the clutch. Fig. 4 is a partial enlarged view of one member of the modified clutch. Fig. 5 is an end view of the clutch member shown in Fig. 3, and Fig. 6 is a sectional view of another form of clutch.

In these figures A is the motor and B the pump.

$a$ is the motor shaft from which the pump is actuated.

$b$ is the pump shaft for actuating the piston of the pump. The piston is not shown as the construction of the same and the devices for actuating it may be of the character preferred by the constructor.

In one form of clutch construction, upon the shaft $b$ is secured the sleeve $c$ provided with the parts forming one of the clutch members. These parts consist of the narrow flange $c'$ at the outer end of the sleeve $c$ extending the greater portion of the distance around the sleeve. Between the ends of the flange $c'$ is an outwardly extending projection $c^2$ of greater thickness than the flange, with a space $c^3$ between each end of the flange and the projection. Upon the shaft $a$ is the gear $a'$ secured thereto and moving with said shaft.

Upon the inner portion of the sleeve $c$ is loosely mounted the gear $d$. This gear is provided on its outer side with the projection $d'$ and the hub of the same extending inwardly is provided with the groove $d^2$. The projection $d'$ is of a size to engage the spaces $c^3$ on either side of the projection.

In the other form of clutch which is illustrated in Fig. 6 the bearing of the shaft $b$ is provided with the outwardly extending sleeve $b'$ upon which the wheel $d$ of the construction heretofore described, is mounted. To the outer end of the shaft is rigidly secured the clutch member comprising a collar having the flange $c'$ and projection $c^2$. The action in this case is the same as that heretofore described, except that when the clutch members are in engagement the wheel revolves upon the sleeve $b'$.

The outlet from the pump cylinder F is at the upper end of the same and is, as usual, provided with a valve permitting the compressed air to escape from the cylinder but preventing the return of the same. This outlet is provided with a nozzle $f$ to which a conducting pipe may be attached. A pipe $f'$ is connected with the nozzle which extends downwardly and connects with the pressure cylinder G. Within this cylinder is a piston $g'$. To this piston or an extension therefrom, is connected an arm $g^2$ having a forked end adapted to engage the groove $d^2$ in the hub of the gear $d$.

In order to enable the gears $a'$ and $d$ to be readily brought into mesh with each other every alternate tooth is cut away on the side of the gear normally nearest the other for about one third of its length, as seen at $a^2$ and $d^3$.

The operation of the device is as follows: A pipe for conducting compressed air from the air pump to a tire to be inflated, is connected at one end to the nozzle $f$ and is provided at the other end with a suitable connection for engaging the tire valve tube. This connection is provided with the usual means for engaging the tire valve stem in the valve tube and opening the same. As soon as the said connecting device is secured in place on the end of the valve tube, thereby opening the tire valve the compressed air already in the tire rushes out through the tube into the nozzle $f$ and thence through the pipe $f'$ to the pressure cylinder G, and moves the piston $g'$ thereof outwardly (to the right in Figs. 1 and 2). The arm $g^2$ moves the gear $d$ toward the gear $a'$. The full length teeth of one enter the spaces between the full length teeth of the other and the gear $d$ is put in motion. This gear being loose upon the sleeve $c$ revolves freely without actuating the shaft $b$. When the full length teeth of the gears $a'$ and $d$ are brought into mesh the projection $d'$ will be forced into contact with the flange $c'$ of the sleeve $c$ and thereafter into contact with the projection $c^2$. When the projections $d'$ and $c^2$ are engaged the shaft $b$ will be put in motion, the sleeve $c$ moving with the gear $d$. The projection $d'$ will then be opposite or in line with a space $c^3$ and the pressure of the piston $g'$ will force the projection into the space, completing the clutch movement.

In many cases where clutches are employed the engagement of the projections $d'$ and $c^2$ would form a sufficient connection between the parts, but as the small amount of air not discharged from the cylinder and the weight of the piston would tend to accelerate the movement on the downward stroke of the piston, it is necessary that the two parts of the clutch should secure a rigid connection in order to provide against back-lash and the noise and jar on a re-engagement of the parts.

A space $c^3$ is provided on each side of the projection $c^2$ to enable the pump to be used in a greater number of positions, and the pump to be used when run in either direction.

The specific form of clutch mechanism herein shown and described is not specifically claimed herein as it forms the subject matter of a divisional application filed by me on the 25 day of Aug., 1913.

What I claim and desire to secure by Letters Patent is:—

The combination with a driving shaft, of a pump provided with an actuating shaft, a driving gear fixed on said driving shaft, a driven gear normally out of alinement with the driving gear, loosely mounted concentrically of the pump shaft, and movable longitudinally thereof, a part connected for rotation with the pump shaft, provided with an arresting face, substantially perpendicular to and extending nearly all the way around said shaft, and a clutch lug projecting beyond said face toward the movable gear, a locking recess being provided between said lug and adjacent portions of the part provided with said arresting face, a lug secured to said movable gear constructed to fit said locking recess and prevent back-lash, and adapted to be arrested by said arresting face, when said gears are in mesh and said clutch lug on the movable gear is in position to engage the first mentioned clutch lug, an actuating cylinder and piston, operative connections between said actuating piston and the movable gear for actuating the same yieldingly, and a connection for pressure fluid between the pump cylinder and the actuating cylinder, whereby said actuating piston may be operated by back pressure to the pump cylinder, to connect the pump shaft and the driving shaft, and hold the connected parts in operative position continuously while the pump is in operation.

In testimony whereof I affix my signature, in the presence of two witnesses.

FRANK E. TEN EYCK.

Witnesses:
 GEO. S. HEDGE,
 JOHN G. MOLINEAUX.